RECORDING ASSEMBLY HAVING CHARACTER AND CODE MARKINGS

Filed Feb. 8, 1962 2 Sheets-Sheet 1

INVENTOR
GUNNAR E. SUNDBLAD
by
Mason, Kolehmainen, Rathburn and Wyss
ATTORNEYS.

INVENTOR
GUNNAR E. SUNDBLAD
by
Mason, Kolehmainen, Rathburn and Wyss
ATTORNEYS

United States Patent Office 3,223,033

Patented Dec. 14, 1965

3,223,033
RECORDING ASSEMBLY HAVING CHARACTER AND CODE MARKINGS

Gunnar E. Sundblad, Bromma, Sweden, assignor to Svenska Dataregister AB, Stockholm, Sweden, a corporation of Sweden Filed Feb. 8, 1962, Ser. No. 171,967
6 Claims. (Cl. 101—368)

This invention relates to data recording means and, more particularly, to means for recording data in coded and character form.

One of the primary difficulties impeding the full utilization of the advantages of a completely automated data handling system is the necessity of converting written data made at the point of initial data collection into data records in a form that can be used in automatic accounting equipment. This operation is time consuming and a source of error. As an example, the audit tape of a cash register includes data items that can be processed to provide sales and other information, but the usual audit strip must be read and manually converted into secondary records expressed in a machine code. This manual operation is avoided in certain types of cash registers by recording the data on the audit strip in only a machine code and then automatically reading or reproducing the coded data using tape reading apparatus, such as the equipment shown in the copending application of Gunnar E. Sundblad, Serial No. 845,873, filed October 12, 1959.

The audit strip used with the reading or sensing means shown in this copending application stores data in the form of printed lines or bars arranged in binary coded combinations that are sensed by photoelectric means. Although this code provides a satisfactory input for accounting equipment, it generally cannot be quickly read or interpreted by the clerk or cash register operator when it becomes necessary for them to inspect the tape. For this reason, it would be desirable to provide means for recording alpha-numeric output information in both coded and character form. This recording means must provide legible characters and yet should not require additional space on the record or be a source of error when the tape is sensed in other data handling equipment.

Accordingly, one object of the present invention is to provide a new and improved recording means.

Another object is to provide a recording means including new and improved means for recording data in both coded and character form.

Another object is to provide means for recording data on a record in both coded and character form which occupies no more space than a coded representation but yet does not make the code difficult to read.

A further object is to provide a recording element having a recording surface divided into discrete areas wherein code recording means are disposed in a selected combination of the areas in accordance with a coded representation of a character and a character recording means is disposed in one of the selected combination of areas to record the character in its usual form.

In accordance with these and many other objects, an embodiment of the present invention comprises a record element, such as drum or type bar, having one or more recording surfaces divided into a plurality of discrete and adjacent areas. To provide a coded representation of a given character, such as an Arabic numeral, each of the areas in a selected combination or permutation thereof is provided with a raised portion for recording a line or bar on the record. The combination of areas in which the bars or lines appear provides a coded representation of the character. To provide a visible representation of the chamber in its usual form, an additional raised portion having the configuration of the character to be recorded is provided in a given one of the areas in the selected combination or permutation thereof in which the code bars or lines are disposed. In this manner, the means for recording the character in its usual form are always located in one of the discrete areas of the recording surface in which is located one of the code recording means. Since the means for recording the character in its usual form is disposed within one of the code areas, the space required to record a character in both coded and character form is not increased. Further, the inclusion of the recorded character in its usual form in the same area in which the code bit or representation appears avoids the possibility of erroneous interpretation of the record when the record is sensed.

Many other objects and advantages of the present invention will become apparent from considering the following detailed description in conjunction with the drawings, in which.

Figure 6:
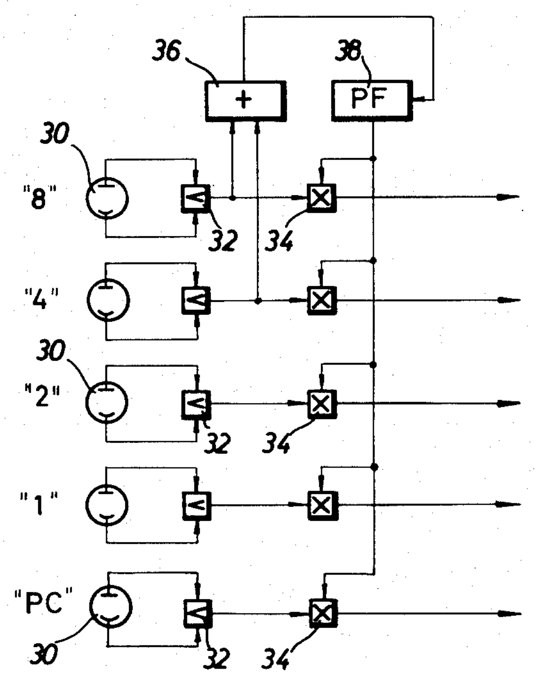
FIG. 6 is a schematic view of a record sensing or reading circuit for reproducing information from a record of the type shown in FIG. 5.

Referring now specifically to the drawings, therein is illustrated a pair of record elements 10 and 12 for recording combined coded and Arabic numerical designations on a record 14 to provide an output record from which recorded data can be both visually determined and photoelectrically sensed by a reading means, such as a reading or detecting circuit 16 illustrated in FIG. 6 of the drawings. The arrangement of the recorded Arabic characters and recorded code bits provided by the recording elements 10 and 12 is such that the Arabic characters fall within the areas assigned to the code bits so as to obviate an increase in the amount of space required to record a single digit while obviating the possibility of an erroneous reading or interpretation by the control circuit 16.

Each of the recording elements 10 and 12 includes one or a plurality of recording surfaces 18 (FIGS. 3 and 4) that is divided into a plurality of discrete and adjacent areas. The coded representation of the desired character is provided by providing raised surfaces 19 (FIGS. 3 and 4) on the elements 10 or 12 in a selected combination or permutation of the areas in the surface 18 in accordance with the coded representation of the character so that a printed line or bar 20 (FIGS. 1 and 5) appears in the corresponding combination of areas on the record 14. An additional raised surface 21 (FIGS. 3 and 4) integral with or contiguous to the code portion 19 in one of the areas of the surface 18 provides a recorded or printed visible representation 22 (FIGS. 1 and 5) of the character in its usual form.

Figure 1:
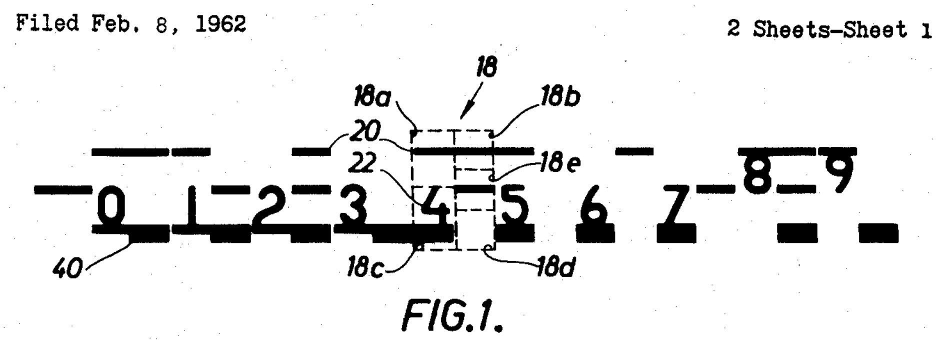
FIG. 1 illustrates the combined code and character representations made by a recording means embodying the present invention.
Figures 2, 3, 4:
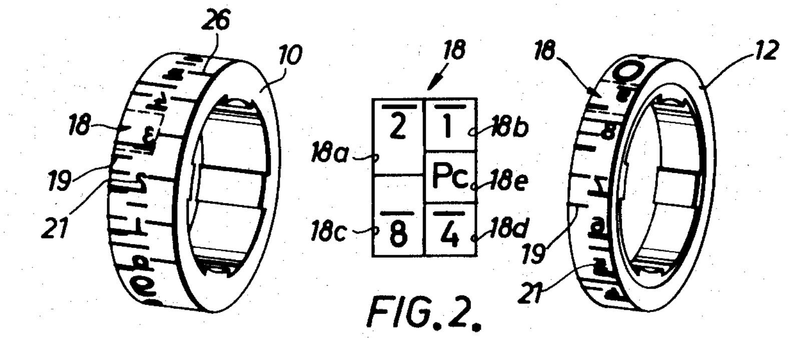
FIG. 2 is a schematic diagram illustrating the code embodied in the recording means.
FIG. 3 is a perspective view of one recording element embodying the present invention.
FIG. 4 is a perspective view of another recording element embodying the present invention.

In the recording elements 10 and 12 illustrated in the drawings, each recording surface 18 is divided into five contiguous and discrete areas 18_a_–18_e_ disposed in a rectangular or other predetermined geometric arrangement, and four of these areas 18_a_–18_d_ are used to store code bits representing a given number by the use of a binary code. The schematic drawing in FIG. 2 illustrates the elements of the code used on the printing elements 10 and 12. The areas 18*a*, 18*b*, 18*c* and 18*d* are assigned to the binary bits "2," "1," "8," and "4," respectively, and the presence of a printed bar or line 20 in any given one of these areas represents the absence of the designated binary bit in the coded representation of the digit. As illustrated in FIG. 1, the digit "4," for instance, is represented by the presence of printed lines or bars 20 in the areas 18*a*, 18*b*, and 18*c* indicating that the coded representation does not include the binary bits "2," "1" and "8," respectively. The absence of a printed bar 20 in the area 18*d* indicates the presence of the binary bit "4." Thus, the pattern of lines or bars 20 represent the digit "4."

The code used on the printing or recording elements 10 and 12 also includes a provision for a parity bit for insuring that an even number of printed lines 20 is provided in each coded representation. A line or bar 20 is selectively printed in the area 18*e* whenever necessary to provide an even number of bits. In the illustrative example set forth above, the coded representation for the digit "4" includes three lines or bars 20 in the areas 18*a*, 18*b* and 18*c*. Since the total number of binary bits provided in this representation is an odd number, i.e., three, a line 20 is recorded in the area 18*e* to provide an even number of code bits. If desired, the code could use an odd number of bits for the parity check.

The printed lines 20 appearing in the representations illustrated in FIG. 1 are used to control or enable the reading of each coded character representation when the record 14 is read by the control circuit 16. This obviates the need for a separate start or read bit. The coded arrangement of the lines 20 within the areas 18*a*–18*d* is such that one of the lines 20 always appears in one of the two areas 18*c* and 18*d* forming one predetermined portion of the geometric arrangement of the code area used to control the enabling of the reading operation of the circuit 16. Preferably, the two areas used for enabling the circuit 16 are disposed along the leading edge of the surface 18 considered in the direction of movement of the record 14 relative to the sensing means in the circuit 16.

To provide the visible representation 22 of the number in its usual or Arabic form, each of the surfaces 18 on the printing elements 10 and 12 is provided with the raised portion 21 of a suitable configuration that is integral with or engages the code raised portion 19 in one of the areas 18*a*–18*b*. In this manner, the amount of space required to print a combined coded and character representation is not increased. Since the area occupied by the printed or recorded representation 22 is always occupied by one of the printed bars 20, the presence of the printed character 22 in the area does not result in an erroneous detection of a data bit when the record 14 is sensed by the circuit 16. Further, the arrangement of the printed representation 22 is such that it appears in only one of the two areas 18*a* and 18*c* forming another predetermined portion of the geometric arrangement of code areas. This permits the areas 18*b* and 18*d* to be reduced somewhat in size to accommodate the area 18*e* used for the parity bit.

Figure 5:
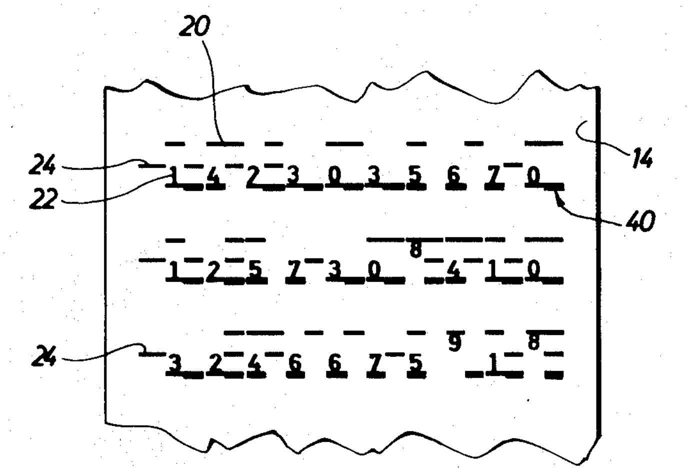
FIG. 5 is a plan view of a record made by the recording elements of the present invention.

A plurality of the printing elements 12 can be assembled in side-by-side relationship along a common axis to record a plural digit entry or line of numerical information on the record 14. It is often desirable to provide an index mark, such as a printed line 24 (FIG. 5), common to the entire line of information. To provide means for recording the common index mark 24, the recording element or drum 10 is provided with a plurality of raised portions 26 (FIG. 4) each adjacent one of the recording surfaces 18 thereon. The recording element 10 is then disposed adjacent either end of the aligned recording elements 12. The record 14 illustrated in FIG. 5 is produced by an assembly of recording elements 10 and 12 in which the element 10 is disposed at the left end of the assembly. Although the recording elements 10 and 12 are illustrated as comprising drums having a plurality of recording surfaces 18 thereon, the recording elements can comprise individual type or recording elements having only a single recording surface 18. Further, the recording elements can comprise type bars having the different recording surfaces spaced horizontally or vertically from each other.

FIG. 6 of the drawings illustrates the control circuit 16 that is used to reproduce the coded information from the record 14. The control circuit 16 includes, for sensing each character, five photoelectric cells 30 adapted to be moved into alignment with the lines or bars 20 recorded in the areas 18*c*, 18*d*, 18*a*, 18*b* and 18*e*, respectively. Each of the photocells 30 is connected to an individual amplifier 32, and output of each amplifier 32 is connected to one input of an AND gate 34. The outputs of the two amplifiers 32 for detecting the presence of binary bits "8" and "4" are also connected to the two input of an OR gate 36, the output of which is connected through a pulse forming circuit 38 to the second input of each of the five AND gates 34.

When a character field is moved into position beneath the photocells 30, the presence of a printed bar 20 controls the related photocell 30 and amplifier 32 to provide an output signal. The printed bars 20 in the areas 18*c* and 18*b* are used to initiate the reading operation. Thus, one of the upper two photocells 30 shown in FIG. 6 must detect a printed line 20. The output signal from one or both of the two amplifiers 32 controlled by these two photocells 30 is coupled through the OR gate 36 and the pulse forming circuit 38 to enable one input to each of the AND gates 34. This enables these AND gates to supply output signals to a utilization circuit representing the binary bits for which a printed line 20 is present. The pattern of output leads from the AND gates 34 on which output signals are and are not provided provides a coded representation of the value of the digit stored on the record 14.

Since the control circuit 16 is placed in operation by detecting the presence of a bit in one of the areas 18*c* or 18*d*, the circuit 16 is controlled to initiate a sensing operation only when the coded representation is in a proper position relative to the photocells 30 and without requiring the provision of a separate start bit in the code. Further, the use of the lines 20 in the areas 18*c* and 18*d* to enable or trigger the reading operation permits the recorded code representations in a line of the record 14 to be displaced vertically from each other while insuring reading of each of the individual coded character representations at only the proper time during its movement past the photocells 30. In addition, the presence of the printed character 22 in one of the character fields 18*a* or 18*c* does not result in a faulty reading by the circuit 16 since the printed representations 22 occur in only those areas in which a code line 20 is also recorded. The interconnection of the printed bar 20 and the printed character 22 also tends to prevent a generation of spurious signals by the photocells 30 resulting from discontinuous printed portions moving past the photocells.

As indicated above, the printed bars 20 in the areas 18*c* and 18*d* provide signals for enabling the AND gates 34. To insure accuracy in reading the printed record 14 and to avoid the possibility of missing one of the bars 20, it is sometimes desirable to complete the enabling of the gates 34 prior to the time at which the printed lines or bars 20 move into the field of the photocells 30. This is accomplished by increasing the width of the printed bar 20 in one of the areas 18*c* or 18*d*, as indicated at 40 in FIG. 1. The enlarged portion 40 can be provided merely by increasing the size of the proper one of the raised portions 19 in the recording surface 18 on the record elements 10 and 12. The width of the line or bar 20 is increased in the direction of movement of the record 14 relative to the photocells 30 so that the gates 34 are enabled by the pulse forming circuit 38 before the remainder of the pattern of bars in the character field is sensed.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A recording element for recording characters in coded and character form comprising a recording element having a surface divided into a plurality of discrete areas disposed in a given geometric arrangement having a predetermined portion including more than one of the discrete areas, code recording means disposed in a selected combination of said areas in accordance with the coded representation of a given character, the selected combination of areas being such that a code recording means is always disposed in one of the areas located in the predetermined portion of the geometric arrangement, and character recording means disposed completely within one of the areas in said combination for recording said character in its usual form.

2. A recording element for recording characters in coded and character form comprising a recording element having a surface divided into a plurality of discrete areas disposed in a given geometric arrangement having two predetermined portions, code recording means disposed in a selected combination of said areas in accordance with the coded representation of a given character, the selected combination of areas being such that a code recording means is always disposed in an area located in one predetermined portion of said geometric arrangement, and a character recording means disposed in one of the areas in said combination and also located in the other of said predetermined portions of said geometric arrangement, said character recording means providing a visible recording of said character in its usual form.

3. A recording element for recording characters in coded and character form comprising a recording element having a surface divided into a plurality of discrete areas disposed in a given geometric arrangement, code recording means disposed in a selected combination of said areas in accordance with the coded representation of a given character, the selected combination of areas being such that a code recording means is always disposed in one of the areas located in a predetermined portion of the geometric arrangement, the code recording means in said one area in the predetermined portion of the geometric arrangement being larger than the code recording means in the remaining ones of the selected combination of areas, and character recording means disposed in one of the areas in said combination for recording said character in its usual form.

4. A recording element for concurrently recording a character on a light reflecting surface in both character form and a coded form providing nonreflective portions suitable for sensing by a number of light responsive means disposed in a predetermined geometric arrangement, which recording element comprises a recording body having a recording surface divided into a plurality of discrete code areas equal in number to the number of light responsive means and disposed in the same geometric arrangement as the light responsive means, code recording means for producing the nonreflective portions, said code recording means being disposed in a predetermined combination of the discrete code areas on the recording surface in accordance with a coded representation of the character to be recorded, and a character recording means for recording the character in its usual form, said character recording means being disposed on the recording surface entirely within a single one of the discrete code areas that also contains a code recording means so that alterations in the light reflecting characteristic of the surface caused by the recording of the character in its usual character form does not alter the response of the light responsive means to the code recordings produced by the code recording means.

5. A method of recording characters on a light reflecting surface in both character form and coded form by providing nonreflective areas adapted to be scanned by a light responsive means responsive to changes in light reflected from a given number of discrete code areas disposed on the light reflecting surface in a predetermined geometric arrangement, which method comprises the steps of altering the light reflecting characteristic of a predetermined combination of the given number of discrete code areas in accordance with a coded representation of the desired character, and recording the desired character in its usual character form in a position on the surface located entirely within one of the discrete code areas having an altered light reflecting characteristic so that any change in the light reflecting characteristic of the surface caused by recording the desired character in its usual form does not cause a false response of the light responsive means.

6. A method of recording characters on a light reflecting surface in both character form and coded form by providing nonreflective areas adapted to be scanned by light responsive means responsive to changes in light reflected from a given number of discrete code areas disposed on the surface in a predetermined geometric arrangement, which method comprises the steps of printing substantially nonreflective portions in a predetermined combination of the given number of discrete code areas on the surface in accordance with a coded representation of the desired character, and printing the desired character in a nonreflective form on said surface disposed entirely within one of the discrete code areas in which a substantially nonreflective portion is also printed so that the change in the reflective characteristic of the surface resulting from the printing of the character in its usual form does not alter the response of the light responsive means to the coded recording of the character.

References Cited by the Examiner

UNITED STATES PATENTS

| | | | |
|---|---|---|---|
| 1,398,435 | 11/1921 | Kolbe | 101—19 |
| 1,514,109 | 11/1924 | Stenstrom | 101—375 |
| 2,114,294 | 4/1938 | Green | 101—369 |
| 2,278,118 | 3/1942 | Pittman | 197—20 |
| 2,520,077 | 8/1950 | Wolowitz | 101—369 |
| 2,567,134 | 9/1951 | Stuivenberg | 101—19 X |
| 2,788,879 | 4/1957 | Rand | 197—172 |
| 2,791,310 | 5/1957 | Jones | 197—172 X |
| 2,909,221 | 10/1959 | Hopp | 101—19 X |
| 3,003,417 | 10/1961 | Englander | 101—375 |
| 3,029,920 | 4/1962 | Seifried | 197—66 |
| 3,031,137 | 4/1962 | Koehler | 235—61.11 |
| 3,052,407 | 9/1962 | Haney | 235—61.11 |

WILLIAM B. PENN, *Primary Examiner.*

MALCOLM A. MORRISON, *Examiner.*